Figure 1:
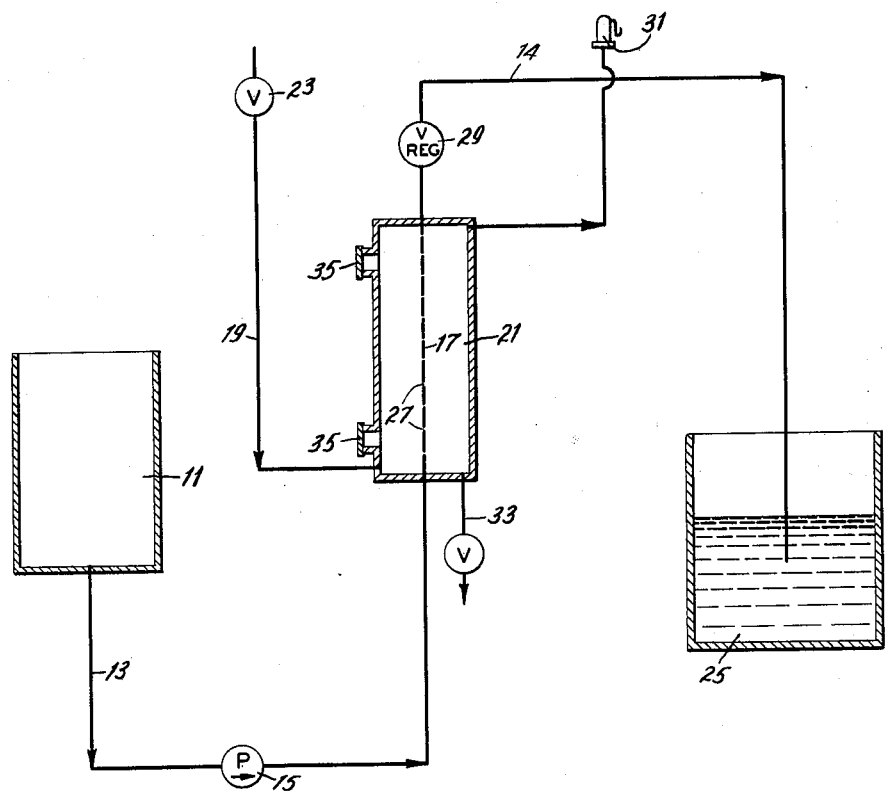

June 14, 1966  R. J. CAREY  3,256,251
SYNTHETIC RESIN LATEX COAGULATION BY CONTACTING WITH STEAM
Filed Jan. 16, 1962

INVENTOR.
ROBERT J. CAREY
BY Francis M. Fajio
ATTORNEY

United States Patent Office 3,256,251
Patented June 14, 1966

---

3,256,251
SYNTHETIC RESIN LATEX COAGULATION BY CONTACTING WITH STEAM
Robert J. Carey, South Charleston, W. Va., assignor to Union Carbide Corporation, a corporation of New York
Filed Jan. 16, 1962, Ser. No. 166,626
4 Claims. (Cl. 260—79.3)

This invention concerns the recovery of solid resinous materials from emulsions thereof. It is particularly related to a method of coagulating solid resinous materials from emulsions thereof by impinging steam on the emulsion, and recovering the coagulated resins therefrom.

The production of synthetic resins by emulsion polymerization technique is well known to the art, and many polymers and copolymers have been produced thereby. The emulsion systems thus produced are generally snow-white fluids, having the appearance of latex, and are therefore generally referred to as latex emulsions. They usually contain up to about 50 percent by weight finely-divided solid particles dispersed in the liquids. These emulsion systems, however, have shown limited commercial utility when the desired use of the resin requires that it be available in the solid form. Accordingly, some method for the recovery of the solid resins from their emulsion has always been required.

Heretofore, the most common method of recovering solid resinous materials from their emulsion has been by electrolytic coagulation of the solid resins from the emulsion, followed by mechanical separation of the coagulated resins from the liquid phase.

Electrolytes which have most commonly been used are well known to the art and they include acid electrolytes (nitric acid, hydrochloric acid, sulfuric acid, acetic acid, etc.), base electrolytes (sodium hydroxide, ammonium hydroxide, organic amines, organic sulfonium compounds, etc.) and salt electrolytes (calcium chloride, sodium chloride, sodium sulfate, ammonium carbonate, etc.). These electrolytes are generally added to the emulsion system in concentrations of up to about 10 percent by weight of the solid resin contained in the emulsions. According to this method, the electrolyte is first added to the emulsion and the entire system is then heated to temperatures up to about 150° C. and, if desired, under pressures up to about 55 p.s.i.g. and kept at these conditions over an extended period of time, usually for several hours with continuous agitation. Accordingly, the resins will agglomerate, and depending upon their densities will either settle to the bottom of the vessel or ascend to the liquid surface. The coagulated resins are then recovered by decantation, centrifugation, filtration, or any other suitable method known to the art.

The term "electrolyte," "coagulation" and "agglomeration" are familiar to the art and need no discussion herein.

There are several serious disadvantages inherent to the coagulation method just described. It is a batch type operation, and the high temperatures and pressures employed over an extended period of time necessitate the use of special and expensive equipment such as a stirred autoclave. Further, since the resins are subjected to elevated temperatures over an extended period of time, the elevated temperatures are often deleterious to some of the important resin properties such as color, clarity, and stability. Also, the resinous products are generally contaminated by some or all the ingredients of the polymerization formula, which are difficult to remove and which impair the qualities of the final product, hence limiting their commercial applicability, and become further contaminated by the added coagulants.

Other methods are known for coagulating solid resinous materials from their emulsions, among which freeze coagulation, mechanical (shear) coagulation, coagulation by heating alone, and coagulation by ageing are significant. None of these methods however has found any commercial success or utility.

It has now been found that synthetic resinous materials can be coagulated from the emulsion thereof by impinging steam upon the resin bearing emulsion at temperatures of from about 105° C. to 160° C. and pressures of from about 5 to 75 p.s.i.g. It is to be understood that the coagulation temperature varies with the softening point of the resin in the particular emulsion system. Thus the coagulation temperature should be sufficiently high to cause adhesion and agglomeration of the resin particles to form a coagulum which is readily separable from the liquid phase by settling, filtration, and washing. On the other hand, the coagulation temperature should not be so high as to cause complete fusion of the resin particles into an unmanageable mass of solid resin. Furthermore, as previously indicated, high coagulation temperatures are detrimental to some of the important resin properties such as color, clarity and stability. With some resinous emulsion systems, particularly resins having high capacity for water absorption, the softening of the resin can be aided by the plasticizing action of hot water.

Electrolytes of the types heretofore described, and non-electrolytic polymers such as polyethylene oxide, may be added to the latex emulsion prior to coagulation, if desired. However, addition of these materials is not essential to the success of this invention as will hereinafter be seen.

When steam is impinged upon an emulsion containing solid resinous materials in a suitable vessel at the specified temperature and pressure, the forces holding the resin particles apart are destroyed, resulting in the agglomeration of the resin particles and the formation of a coagulum. The coagulated resins can then be separated from the liquid by mechanical means known to the art.

Although the processes of this invention can be successfully carried out at the above-specified conditions, it has been found preferable to operate at coagulation temperatures of from about 105° C. to 150° C. and coagulation pressures of from about 5 to 55 p.s.i.g.

The invention will be more fully understood after reference has been had to FIGURE 1, attached, which is a schematic flow diagram of the process of this invention.

Referring to FIGURES 1, the emulsion is supplied from tank 11 via feed line 13 through which it is fed to coagulator 17 under pressure applied by pump 15. Coagulator 17 is generally a straight tube or pipe having one or more perforations 27 on its surface through which steam can enter into coagulator 17 and impinge upon the emulsion stream. Coagulator 17 is suitably connected at both ends; one end being connected to feed line 13, and the other end being connected to coagulum discharge line 14. Coagulator 17 is suitably disposed in a steam chamber 21 which is generally a hollow cylindrical vessel suitably supported at its lower end (supports not shown). Steam is supplied via steam conduit 19 to steam chamber 21, which chamber is maintained at higher pressure than the pressure in coagulator 17 at all times during the coagulation period in order to prevent the coagulum from flowing out of coagulator 17 into steam chamber 21 through perforations 27. The steam supply to steam chamber 21 is controlled by valve 23 which is preferably automatically controlled, though it can also be a hand controlled valve such as globe valve, gate valve, etc. The steam from said steam chamber 21 impinges upon the emulsion stream flowing through coagulator 17 through perforations 27 which are adequately spaced on the surface of coagulator 17 as will hereinafter be discussed in connection with steam rate requirement. The coagulum is formed almost immediately upon the impingement of steam on the emulsion stream. The coagulum is discharged through the coagulum discharge line 14 into a coagulum receiver 25. The coagulum receiver 25 can be an open vessel, a vessel maintained under pressure which is lower than coagulator pressure, or a cyclonic type recovery apparatus wherein the solids are directly separated from the liquid phase. The internal pressure within the coagulator can be regulated and maintained by a pressure regulator 29 which can be a quick opening valve, an automatic pressure regulator, or a venturi type tube, all of which are familar to the art. A safety valve 31 is provided for steam chamber 21 to protect it against excessive pressure accumulation. Steam chamber 21 is also provided with a drain 33 to eliminate steam condensate therefrom, and with one or more manways 35 for accessibility to coagulator 17 for cleaning purposes.

In the process of this invention proper temperature and pressure control are essential. The optimum conditions vary with the particular resin and depend upon the composition and, in particlar, on the softening point of the resin in the latex. Thus, for example, the variations of the optimum conditions of coagulation with variations in resin composition is illustrated in Table I below.

TABLE I.—RELATIONSHIP OF TEMPERATURE AND PRESSURE TO RESIN COMPOSITION

| Resin Composition | Internal Pressure, p.s.i.g. | Internal Temperature, ° C. |
|---|---|---|
| 40/60 VCN/VCl | 20-25 | 126-130 |
| 70/20/10 VCN/VCl/VCl$_2$ | 30-35 | 134-138 |
| 70/30 VCN/VCl | 40-45 | 141-144 |

In Table I above, the abbreviations VCN, VCl, and VCl$_2$ refer to acrylonitrile, vinyl chloride, and vinylidene chloride, respectively. The internal temperature and pressure refer to the conditions within the coagulator.

Contact time between steam and the emulsion is not critical. The resinous materials contained in the emulsion are agglomerated immediately upon contact with steam, usually within a fraction of a second. The contact time was varied, however, from 0.1 to 10 seconds by varying the emulsion feed rate to the coagulator, and the resulting products were compared. In all cases the products were found to be similar in properties and no substantial differences were observed. Shortest possible contact time, however, is preferred to minimize thermal degradation of the resin.

The process of this invention is capable of handling wide ranges of emulsion charge rates to the coagulator. For example, the emulsion feed rate was varied from 20 to 650 gallons per hour with about the same degree of efficiency of agglomeration in the coagulator. The resin properties were substantially similar in all cases.

Steam rate requirement is generally dependent upon the emulsion feed rate which is employed. Generally about 0.25 to 0.50 lb. of steam is required per pound of the emulsion which is charged to the coagulator for effect and complete coagulation of the solid resins from emulsions thereof. Steam can enter the coagulator concurrently or countercurrently to the emulsion flow, or in any other suitable manner with the same efficacious results. Best results are obtained however when steam impinges upon the emulsion stream through perforations located on the surface of the coagulator. The number of perforations required depend upon the emulsion feed rate through the coagulator. For example, when the emulsion feed rate was about 30 gallons per hour three or four 1/8" diameter holes were found adequate to supply the steam quantity and rates required for complete and effective coagulation of the solid resins from their emulsions. However, when the emulsion feed rate of 650 gallons per hour was employed, about twenty 1/8" diameter holes were found necessary for adequate supply of steam and complete coagulation of the resins. These perforations are preferably equally spaced along the surface of the coagulator and can be arranged as rows of equally spaced holes along the surface of the coagulator.

It has also been discovered that steam requirement can be effectively reduced by preheating the emulsion stream prior to entering the perforated tube. Thus the steam requirement can be reduced to a level lower than 0.25 lb. per lb. of emulsion when the emulsion stream has been preheated prior to contacting with steam. The reduction in steam requirement depends upon the degree of preheating of the emulsion feed. When the internal temperature and pressure in the perforated tube are optimum and the steam supply is adequate, efficiencies of aproximately 90 to 100 percent are generally obtained. By efficiency is meant the percent by weight of resinous material in the feed which is completely coagulated by contacting the emulsion with steam in the perforated tube.

Electrolytes can be added to the emulsion system if desired though they are not necessary to the success of the process of this invention. When electrolytes are used in conjunction with steam coagulation, the coagulation efficiency is slightly improved over the use of electrolytes alone without adverse effects upon the resin qualities, because the quantity of electrolytes used is generally very small as compared to the quantity which is used in conventional coagulation methods hereinbefore described. For example, only 0.1 to 0.3 percent calcium chloride is used as a coagulation assistant when the coagulation is carried out according to the process of this invention, whereas 3 to 5 percent calcium chloride is generally needed in conventional coagulation methods. The large quantities of electrolytes employed in the conventional methods have been found to have adverse effects upon the properties of the resins which are produced. Similarly, 1 to 2 percent sodium chloride, acid electrolyte, or base electrolyte are sufficient when used in conjunction with steam coagulation, whereas 2 to 10 percent of these electrolytes are generally required in the conventional coagulation method.

Although the present invention has heretofore been described with a certain degree of particularity in the manner of operation, it is to be understood that other variations and modifications can be made in the manner of operation without departing from the scope of the invention herein. For example, the process of this invention can be carried out by forcing an emulsion stream through a jet or an orifice into an area such as an open channel, and impinging steam upon the emulsion stream, whereupon immediate coagulation of the resin will be observed. The coagulum which is formed is continuously discharged from the open channel into a coagulum receiver. Alternatively, the resin bearing emulsion can be charged continuously to a suitable vessel or a tubular reactor, and the steam impinged thereon concurrently, countercurrently, or otherwise in said vessel or tubular reactor, with the coagulum formed being discharged into a second vessel wherefrom the resin can be separated and recovered in the solid form as hereinbefore described.

Coagulation by steam impingement heretofore described must be distinguished from ordinary steam sparging operation known in the art wherein steam is sparged directly into a large volume of the latex emulsion.

The process of this invention therefore provides a novel, efficient, and commercially feasible method of coagulating solid resinous materials from emulsions thereof. The coagulated resins are readily separable from the liquid phase by decantation, filtration, centrifugation or any other suitable method known to the art.

The process of this invention can be carried out continuously in inexpensive equipment and is therefore readily amenable to commercial operations. According to the present invention the resins are coagulated almost immediately and, unlike the methods of the prior art, they are not subjected to high temperatures over an extended period of time, a treatment which is known to have adverse effects upon some of the important properties of the resins. Very little, or no contaminants are observed in the resinous products obtained by the process of this invention. Even when electrolytes are used to assist the coagulation, the amount of the contaminants in the resins is so small that the resin properties are not adversely effected thereby. Also the coagulum which is formed by the process of this invention is more easily washed and filtered than the coagulum formed by conventional methods, as will hereinafter be seen from the examples which will follow.

The resinous products which are obtained by the process of this invention have widespread and numerous commercial applications. They are generally used in textile fibers, films, molding, extrusion, and many other useful applications.

The following examples are included by way of illustration in order to more fully understand the present invention. These examples however are not intended to limit the scope of the invention, as many variations and modifications can be made without substantial departure from the spirit of this invention. Also the invention is not to be limited to the types of resins mentioned in the examples herein but may include a variety of other types of resins such as those derived from butadiene, styrene, vinyl acetate, vinyl chloride, vinylidene chloride, acrylates, etc., or any suitable copolymers and terpolymers thereof.

Example 1

Four thousand cubic centimeters of an emulsion containing 520 grams (about 13 weight percent) of a 30/70 vinyl chloride/acrylonitrile copolymer was charged to a vessel and the vessel was pressurized to 55 p.s.i.g. with nitrogen. The emulsion was forced continuously through an orifice into a discharge pipe, located at the bottom of the vessel, wherein it was impinged upon by steam. The steam pressure was maintained at 45 p.s.i. (10 p.s.i. lower than vessel pressure) to insure flow of latex. The steam flow rate and pressure were regulated by a motor valve in the steam supply line. The steam was introduced through an opening in the discharge pipe immediately downstream of the orifice. The latex emulsion was thus coagulated immediately upon impingement by steam and the coagulum which was formed was continuously discharged into a coagulum receiver. The coagulated resins were then separated by filtering the coagulum, followed by washing and drying of the resins. The coagulation pressure in this experiment was about 45 p.s.i.g. and the coagulation temperature was about 145° C. Approximately 236 grams of resin was recovered corresponding to a coagulation efficiency of about 45%.

Example 2

Example 1 was repeated except that 11.5 grams of an electrolyte (nitric acid) was added to the emulsion and the vessel was pressurized to 50 p.s.i.g. with nitrogen. The coagulation pressure and temperature were about 40 p.s.i.g. and 142° C., respectively. Approximately 236 grams of resin was recovered corresponding to a coagulation efficiency of about 45%.

Example 3

Example 2 was repeated except that the vessel was pressurized to 47.5 p.s.i.g. with nitrogen and the coagulation pressure and temperature were about 37.5 p.s.i.g. and 140° C., respectively. Approximately 236 grams of resin was recovered corresponding to a coagulation efficiency of about 45%.

Example 4

Example 2 was repeated except that the vessel was pressurized to 35 p.s.i.g. with nitrogen and the coagulation pressure and temperature were about 25 p.s.i.g. and 130° C, respectively. Approximately 236 grams of resin was recovered corresponding to a coagulation efficiency of about 45%.

Table II below summarizes the experimental conditions and some of the properties of the resins which were obtained.

TABLE II

| Example | Electrolyte Used | Steam Pressure, p.s.i.g. | Filter Time,[1] sec. | Wash Time,[2] sec. | Specific Viscosity | Turbidity[3] | ICV[4] | HCV[5] |
|---|---|---|---|---|---|---|---|---|
| 4 | Nitric Acid | 25.0 | 145 | 450 | 0.401 | 18.8 | 90.7 | 81.4 |
| 3 | do | 37.5 | 53 | 217 | 0.392 | 13.2 | 92.8 | 83.7 |
| 2 | do | 40.0 | 9 | 53 | 0.380 | 6.8 | 92.9 | 84.9 |
| 1 | None | 45.0 | 21 | 89 | 0.354 | 5.5 | 92.5 | 84.4 |

[1] 1,000 cc. slurry through 0.1 sq. ft. of filter area.
[2] 1,000 cc. water through resin cake.
[3] Haze rating of 25% solution of resin in acetonitrile.
[4] Initial color value of a 2% solution of the resin in an 85/15 (wt. percent) mixture of ethylene and propylene carbonates.
[5] Color value of solution after heating for 16 hours at 100° C.

From Table II it will be observed that although an electrolyte can be used if desired, resins with inherent high qualities can be obtained when electrolytes are not used. This is evidenced by a comparison of the properties of the resins obtained from Example 1 with those obtained from Examples 2, 3 and 4.

Example 5

Forty pounds of an emulsion containing 5.2 pounds of a 30/70 vinyl chloride/acrylonitrile copolymer was charged to a feed tank. The emulsion was fed from the feed tank to a coagulator by a positive displacement pump. The coagulator used herein consisted of 1.00 inch O.D., 0.50 inch I.D. perforated Teflon tube, 22 inches long, and having seven ⅛ inch perforations therein. The coagulator was suitably disposed in a leak-proof, cylindrical steam chamber consisting of a 2 inch stainless steel pipe about 20 inches long. The emulsion was fed to the coagulator at a constant rate of 45 gallons per hour. Steam was supplied from a 200 p.s.i.g. steam supply source through a 1 inch steam line into the steam chamber wherefrom it impinged upon the emulsion stream through the perforations in the coagulator. The pressure in the steam chamber was maintained at a higher level than the pressure within the coagulator at all times during the coagulation period to prevent the emulsion from forcing its way out of the perforations into the steam chamber. Coagulation resulted immediately upon impingement of steam on the emulsion stream in the coagulator, and the coagulum which was formed was continuously discharged via a coagulum discharge line into an open vessel wherefrom the resins were subsequently recovered by filtration, washing, and drying. A pressure regulator was provided in the coagulum discharge line to regulate and control the internal pressure within the coagulator.

The pressure within the coagulator tube is effected by the emulsion feed rate, the steam supply, and the regulator setting on the coagulum discharge line. Variation of any of these factors result in pressure variation within he coagulator tube. Steam condensate was bled out of the steam chamber by a bleed valve located in the bottom of the steam chamber.

Table III below summarizes the experimental conditions and the properties of the coagulum obtained by operation under various pressures.

TABLE III

| Sample | A | B | C |
|---|---|---|---|
| Steam Supply, p.s.i.g. | 200 | 200 | 200 |
| Steam Chamber Pressure, p.s.i.g. | 49 | 55 | 60 |
| Emulsion Feed Line Pressure, p.s.i.g. | 38 | 42 | 47 |
| Internal Coagulator Pressure, p.s.i.g. | 24 | 26 | 32 |
| Internal Coagulator Temperature, °C. | 130 | 132 | 136 |
| Emulsion Feed Rate, g.p.h. | 45 | 45 | 45 |
| Vacuum Filter Test: | | | |
| 1,000 cc. Dewater, sec.[1] | 59 | 55 | 30 |
| 300 cc. Cake Wash, sec. | 750 | 268 | 150 |
| Dry Resin in Filter Cake [2] | 95.8 | 97.5 | 98.7 |
| Dry Resin in Effluent [3] | 4.2 | 2.5 | 1.3 |

[1] 1,000 cc. slurry through 0.1 sq. ft. of duck filter cloth.
[2] Percent of total resin in 1,000 cc. collected in filter cake.
[3] Percent of total resin in 1,000 cc. collected from filtrate.

It will be observed from the above table that coagulum processability is improved when operating at higher internal temperaures and pressures.

*Example 6*

Forty founds of an emulsion containing 6.3 lbs of a 70/20/10 terpolymer of acrylonitrile/vinyl chloride/vinylidene chloride was charged to a feed tank. Forty pounds of distilled water was also added to the feed tank and the diluted emulsion was fed to a coagulator by a positive displacement pump at a rate of 31 gallons per hour. The coagulator and the steam chamber employed in this experiment were the same as in Example 5. Steam was supplied from steam supply source to the steam chamber wherefrom it impinged upon the emulsion stream through the perforations in the coagulator. The coagulum which was formed was continuously discharged into an open vessel containing 39.2 lbs. of water. When the run was completed, the total quantity in the receiving vessel, including steam condensate, was 137.1 lbs. The original quantity of the diluted emulsion charged and the receiver content was 119.2 lbs. Therefore, 17.9 lbs. of steam was employed in coagulating approximately 80 lbs. of the emulsion; which is equivalent to 0.22 lb. steam per lb. of emulsion charged to the coagulator. The resin was recovered from the coagulum by vacuum filtration and perforate bowl centrifugation. The resin was found useful for fiber spinning applications.

*Example 7*

Twenty pounds of an emulsion containing 2.6 pounds of a 70/28.5./1.5 acrylonitrile/vinyl chloride/sodium (methacryloxyethoxy) benzene sulfonate terpolymer was charged to a feed tank. The emulsion was fed from the feed tank to a coagulator by a positive displacement pump at the rate of 30 gallons per hour. The coagulator used consisted of ½ inch I.D. Teflon tube, six inches long, having three ⅛ inch perforations therein. The coagulator was suitably disposed within a leak-proof steam chamber consisting of 1½ inch stainless steel tube, six inches long. Steam was supplied from a steam supply source to the steam chamber wherefrom it impinged upon the latex emulsion through the perforations in the coagulator. Immediate coagulation resulted, and the coagulum was discharged through a coagulum discharge line continuously into a coagulum receiver. The coagulum was separated by filtration, washing and drying to recover the solid resin.

Pressure within the coagulator was regulated and controlled by a pressure regulator located in the coagulum discharge line. No coagulant was used in this example.

Table IV summarizes the experimental conditions in the above example as well as in Examples 8–10 below.

*Example 8*

Example 7 was repeated with the exception that 0.37% calcium chloride (wt. percent of solid resin) was added to the latex emulsion in the feed tank as a coagulant prior to coagulation with steam.

*Example 9*

Fifteen pounds of an emulsion containing 2 pounds of a 70/28.5/1.5 acrylonitrile/vinyl chloride/sodium (methacryloxyethoxy) benzene sulfonate was charged to a feed tank. To this emulsion was added 0.025% of an aqueous solution of an ethylene oxide polymer (polyether) as a coagulant (percentage is based on weight of solid resins in the emulsion). The coagulator and the steam chamber used herein were the same as those used in Examples 7 and 8. The emulsion was fed to the coagulator at the rate of 30 gallons per hour. Steam was supplied from a steam supply source to the steam chamber wherefrom it impinged upon the latex emulsion through the perforations in the coagulator. Immediate coagulation resulted and the coagulum was discharged continuously through a coagulum discharge line into a coagulum receiver wherefrom the resin was separated by filtration, washing and drying to recover the solid resins.

Pressure within the coagulator was regulated and controlled by a pressure regulator located in the coagulum discharge line.

*Example 10*

Example 9 was repeated with the exception that the coagulant used was a mixture of an aqueous solution of calcium chloride containing 0.20% calcium chloride based on the weight of solid resins in the emulsion, and an aqueous solution of polyethylene oxide containing 0.025% polyethylene oxide based on the weight of solid resins in the emulsion.

TABLE IV

| Example | 7 | 8 | 9 | 10 |
|---|---|---|---|---|
| Steam Supply, p.s.i.g. | 200 | 200 | 200 | 200 |
| Steam Chamber Pressure, p.s.i.g. | 60 | 60 | 60 | 60 |
| Internal Coagulator Pressure, p.s.i.g. | 40 | 40 | 40 | 40 |
| Internal Coagulator Temperature, °C. | 142 | 142 | 142 | 142 |
| Emulsion Feed Rate, g.p.h. | 30 | 30 | 30 | 30 |
| Vacuum Filter Test: | | | | |
| Filter Time, sec.[1] | 5 | 5 | 9 | 9 |
| Wash Time, sec.[1] | 11 | 16 | 45 | 30 |
| Coagulation Efficiency, percent | 81.4 | 98.5 | 94.5 | 98.8 |

[1] 500 cc. through 0.1 sq. ft. of duck filter cloth.

*Example 11*

Five pounds of a polymerization emulsion containing 1.59 pound (31.8 wt. percent of poly(vinyl chloride) was added to a feed tank. The emulsion was diluted with 4 pounds of water and the diluted emulsion was fed to a coagulator by a positive displacement pump at the rate of about 30 gallons per hour. The coagulator employed consisted of a 0.50 inch I.D. Teflon tube, six inches long, having three ⅛ inch perforations therein. The coagulator was suitably disposed within a leak-proof cylindrical steam chamber 2 inches I.D. and 6 inches long. Steam was supplied from a steam supply source to the steam chamber wherefrom it impinged upon the emulsion through the perforations in the coagulator. Immediate coagulation was observed and the coagulated slurry was dischared through a coagulum discharge line into a cyclone type separator wherefrom the resin was separated, diluted with 8 pounds of water, and finally separated by a basket centrifuge.

The pressure within the coagulator was regulated by a venturi located in the coagulum discharge line. The pressures in the emulsion feed line, steam chamber and coagulator were maintained at 32 p.s.i.g., 38 p.s.i.g. and 30 p.s.i.g., respectively. Thus the coagulation temperature was 135° C. Approximately 0.98 pound of resin was recovered corresponding to about 61.7% coagulation efficiency.

The resin was found useful for molding and film casting operations.

Additional experiments were conducted (Examples 12–17) wherein emulsions of various resins were subjected to coagulation by steam in the same manner as described in Example 11, with the exception that the pressures within the system were varied in each example.

Table V below summarizes the results of Examples 11–17.

2. The method of claim 1 wherein said polymeric material is copolymer of acrylonitrile and vinyl chloride.

3. The method of claim 1 wherein said polymeric material is terpolymer of acrylonitrile, vinyl chloride and vinylidene chloride.

4. The method of claim 1 wherein said polymeric material is terpolymer of acrylonitrile, vinyl chloride and sodium (methacryloxyethoxy)benzene sulfonate.

TABLE V

| Example | 11 | 12 | 13 | 14 | 15 | 16 | 17 |
|---|---|---|---|---|---|---|---|
| Resin in Emulsion | Poly(vinyl chloride) | 80/20 Vinyl chloride/vinyl acetate | 60/40/1 Styrene/butadiene/acrylic acid | Natural Rubber | Polyacrylonitrile | Polyacrylonitrile [1] | Polymethylmethacrylate |
| Latex Charged, lbs | 5 | 4.2 | 4.2 | 1.2 | 4.0 | 3.9 | 3.3 |
| Resin Content in Latex, lbs | 1.59 | 1.34 | 1.73 | 0.63 | 0.98 | 0.905 | 0.80 |
| Water Charged, lbs | 4 | 4.2 | 8.4 | 3.6 | None | 3.5 | None |
| Emulsion Charge Rate, g.p.h | 30 | 30 | 30 | 30 | 30 | 30 | 30 |
| Pressure, p.s.i.g.: | | | | | | | |
| Steam Chamber | 38 | 22 | 70 | 90 | 84 | 82 | 40 |
| Latex Supply Line | 32 | 12 | 20 | 22 | 70 | 72 | 30 |
| Coagulator | 30 | 12 | 1 | 1 | 66 | 60 | 24 |
| Coagulation Temperature, °C | 134 | 128 | 101 | 101 | 156 | 153 | 130 |
| Net Dry Resin Recovered, lbs | 0.982 | 0.771 | 0.846 | 0.166 | 0.600 | 0.88 | 0.40 |
| Coagulation Efficiency, percent | 61.7 | 57.5 | 49.2 | 26.3 | 61.2 | 97.2 | 50.0 |
| Emulsion Charge Rate, g.p.h | 30 | 30 | 30 | 30 | 30 | 30 | 30 |

[1] 0.2% CaCl₂ (on weight of resin) added as coagulation assistant.

What is claimed is:

1. The method of coagulating emulsion of polymeric materials selected from the group consisting of copolymers of acrylonitrile and vinyl chloride; terpolymers of acrylonitrile, vinyl chloride and vinylidene chloride; and terpolymers of acrylonitrile, vinyl chloride and sodium (methacryloxyethoxy)-benzene sulfonate which comprises passing said emulsion continuously through a perforated tube having at least one perforation, impinging steam upon said emulsion through said perforation, the rate of said steam being from about 0.25 to about 0.50 pound per pound of the emulsion feed rate, maintaining a temperature of from about 105° C. to about 160° C. and a pressure of from about 5 to about 75 p.s.i.g. in said perforated tube, thereby coagulating said emulsion and forming a coagulum in said perforated tube, discharging said coagulum from said perforated tube and recovering the coagulated material from the coagulum.

References Cited by the Examiner

UNITED STATES PATENTS

| | | | |
|---|---|---|---|
| 2,426,127 | 8/1947 | Thomas et al. | 260—96 |
| 2,451,332 | 10/1948 | Green | 260—29.7 |
| 2,462,013 | 2/1949 | Waterman | 260—29.7 |
| 2,495,147 | 1/1950 | Street | 260—96 |
| 2,556,260 | 6/1951 | Downing | 260—96 |
| 2,647,103 | 7/1953 | Griffin et al. | 260—79.3 |
| 2,686,171 | 8/1954 | Crouch | 260—79.3 |
| 2,867,805 | 1/1959 | Ludewig | 260—96 |
| 2,915,489 | 1/1959 | White | 260—821 |
| 3,056,772 | 10/1962 | Wallace | 260—94.7 |

WILLIAM H. SHORT, *Primary Examiner.*

J. R. LIBERMAN, *Examiner.*